(12) United States Patent
Butt et al.

(10) Patent No.: US 7,266,815 B2
(45) Date of Patent: Sep. 4, 2007

(54) AUTOMATED CONTROL OF A LICENSED INTERNAL CODE UPDATE ON A STORAGE CONTROLLER

(75) Inventors: Edward George Butt, Tucson, AZ (US); Jack Harvey Derenburger, Tucson, AZ (US); Steven Douglas Johnson, Tucson, AZ (US); Vernon J. Legvold, Tucson, AZ (US); Ronald David Martens, Benson, AZ (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 10/674,300

(22) Filed: Sep. 29, 2003

(65) Prior Publication Data

US 2005/0071837 A1    Mar. 31, 2005

(51) Int. Cl.
*G06F 9/44*    (2006.01)
*G06F 11/00*    (2006.01)
(52) U.S. Cl. .......................................... 717/168; 714/7
(58) Field of Classification Search ........ 717/168–178; 711/114, 161, 162, 202; 714/20, 28; 709/221; 704/204; 710/14
See application file for complete search history.

(56) References Cited

U.S. PATENT DOCUMENTS

| | | | |
|---|---|---|---|
| 5,579,222 A | 11/1996 | Bains et al. ................. 395/712 |
| 5,649,112 A | 7/1997 | Yeager et al. .......... 395/200.01 |
| 5,745,879 A | 4/1998 | Wyman .......................... 705/1 |
| 5,758,069 A | 5/1998 | Olsen ..................... 395/187.01 |
| 5,886,991 A | 3/1999 | Guarneri et al. ............. 370/389 |
| 5,905,860 A | 5/1999 | Olsen et al. ........... 395/187.01 |
| 6,385,201 B1 | 5/2002 | Iwata ......................... 370/400 |
| 6,401,120 B1 | 6/2002 | Gamache et al. ........... 709/226 |
| 6,418,554 B1 | 7/2002 | Delo et al. ..................... 717/11 |
| 6,553,507 B1 | 4/2003 | Cohen ............................ 714/4 |
| 6,816,950 B2 * | 11/2004 | Nichols ....................... 711/162 |
| 7,032,218 B2 * | 4/2006 | Shirasawa et al. ........... 717/168 |
| 2001/0011253 A1 | 8/2001 | Coley et al. ................... 705/59 |
| 2001/0013024 A1 | 8/2001 | Takahashi et al. ............. 705/59 |
| 2002/0116665 A1 | 8/2002 | Pickover et al. ............... 714/38 |
| 2002/0128976 A1 | 9/2002 | O'Connor et al. ............. 705/59 |

(Continued)

OTHER PUBLICATIONS

SGI TPL, 'SGI Total Performance 9100 (2Gb TP9100) Storage System User's Guide', Sep. 27, 2003, (chap. 1:pp. 1-30, chap. 3: pp. 1-12; chap. 4: pp. 1-12) <http://techpubs.sgi.com/library/tpl/cgi-bin/getdoc.cgi/linux/bks/SGI_EndUser/books/SGI9100_OG/sgi_html/ch01.html>.*

*Primary Examiner*—Tuan A. Vu
(74) *Attorney, Agent, or Firm*—Chandler & Udall, LLP; Dale F. Regelman

(57) ABSTRACT

A system, method and article of manufacture are provided to perform an automated concurrent licensed internal code (LIC) update and an automated nonconcurrent LIC update on a storage controller. The automated concurrent LIC update is performed on a storage controller by sequentially updating each cluster while maintaining operation of the storage controller. The automated concurrent LIC update allows multiple hosts to continue to access data via the storage controller while the system is actively undergoing the LIC update. The automated nonconcurrent LIC update is performed during the time the storage controller in not operating. The automated nonconcurrent LIC update allows service personnel to perform the update in an efficient and timely manner. When the update has completed, the storage controller becomes available to process data and the system is operating at the latest LIC level.

14 Claims, 5 Drawing Sheets

U.S. PATENT DOCUMENTS

2002/0138745 A1    9/2002  Cognigni et al. ........... 713/189
2002/0161718 A1   10/2002  Coley et al. ................. 705/59
2002/0194010 A1   12/2002  Bergler et al. ................ 705/1

* cited by examiner

AUTOMATED CONTROL OF A LICENSED INTERNAL CODE UPDATE ON A STORAGE CONTROLLER

CROSS-REFERENCES TO RELATED APPLICATIONS

The present application is related to a copending patent application currently having Ser. No. 10/674,295, entitled "Automated Error Recovery of a Licensed Internal Code Update on a Storage Controller", TUC9-2003-0159, filed on an even date herewith, the disclosure of which is hereby incorporated by reference in its entirety.

FIELD OF THE INVENTION

The present invention relates to the Licensed Internal Code (LIC) update on an storage controller. More particularly, the invention provides for an automated LIC update with minimal interruption in system usage.

BACKGROUND OF THE INVENTION

Computing systems often include one or more host computers (hosts) for processing data and running application programs, direct access storage devices (DASDs) for storing data, and a storage controller for controlling the transfer of data between the hosts and the DASD. Storage controllers, also referred to as control units or storage directors, manage access to a storage space that often comprises numerous hard disk drives. Hosts may communicate Input/Output (I/O) requests to the storage space through the storage controller.

To maintain availability in the event of a failure, many storage controllers provide redundant hardware clusters. Each hardware cluster comprises a processor complex, cache, nonvolatile storage (NVS), and separate power supplies. The NVS in one cluster backs up write data from the cache in the other cluster so that if one cluster fails, the write data in the cache of the failed cluster is stored in the NVS of the surviving cluster. After a cluster fails, all I/O requests would be directed to the surviving cluster. When both clusters are available, each cluster may be assigned to handle I/O requests for specific logical storage devices configured within the physical storage devices.

It is necessary to periodically update the software on each of the clusters of the storage controllers. Multiple hardware devices within each of the clusters may need software updates resulting in a complicated and time consuming process. This process is typically done manually by qualified service personnel. When problems are encountered during the update process the service personnel may have to perform repair actions and then start over with the software update process. This adds further to the time to update the software and may contribute to increased downtime for the storage controller. There is a need for an automated system to update LIC software on storage controllers.

SUMMARY OF THE INVENTION

The present invention solves the problem where service personnel are required to be on-site to manage a LIC update on a storage controller. It also reduces the likelihood of service personnel induced errors, that in prior art systems resulted in the storage facility becoming unavailable to a customer, directly impacting customer satisfaction and access.

In the present invention an automated LIC update is performed on a storage controller by sequentially updating each cluster. One cluster will be controlling (master) the update while the other cluster (slave) will be the target of the LIC update process. When the update is completed on the first cluster, control is passed to the updated cluster and the updated cluster becomes the master while the previous (now slave) cluster undergoes the LIC update. When the update has completed, both clusters become available and the system is running at the latest LIC level. The transfer of control between clusters is transparent to the attaching host systems and the on-site service personnel and therefore improves the LIC update time, reliability, and availability.

An object of the present invention, therefore, is to provide an improved method for updating LIC software and firmware on a storage controller.

Another object of the present invention is to provide automated control of the LIC update while maintaining operation of the storage controller during a concurrent LIC update.

A further object of the present invention is to provide automated control of a nonconcurrent LIC update for service personnel.

In a first embodiment, a system, method and article of manufacture are provided to perform an automated concurrent LIC update on a storage controller. The LIC update software is delivered from a software source and is received by the storage controller at the beginning of the LIC update process. The automated concurrent LIC update is performed while maintaining operation of the storage controller. The automated concurrent LIC update allows multiple hosts to continue to access data via the storage controller while the system is actively undergoing the LIC update.

In a second embodiment, a system, method and article of manufacture are provided to perform an automated nonconcurrent LIC update on a storage controller. The LIC update software is delivered from a software source and is received by the storage controller at the beginning of the LIC update process. The automated nonconcurrent LIC update is performed during the time the storage controller in not operating. The automated nonconcurrent LIC update allows service personnel to perform the update in an efficient and timely manner.

The foregoing and other features and advantages of the invention will be apparent from the following more particular description of preferred embodiments of the invention, as illustrated in the accompanying drawings.

DETAILED DESCRIPTION OF THE INVENTION

Figure 1:
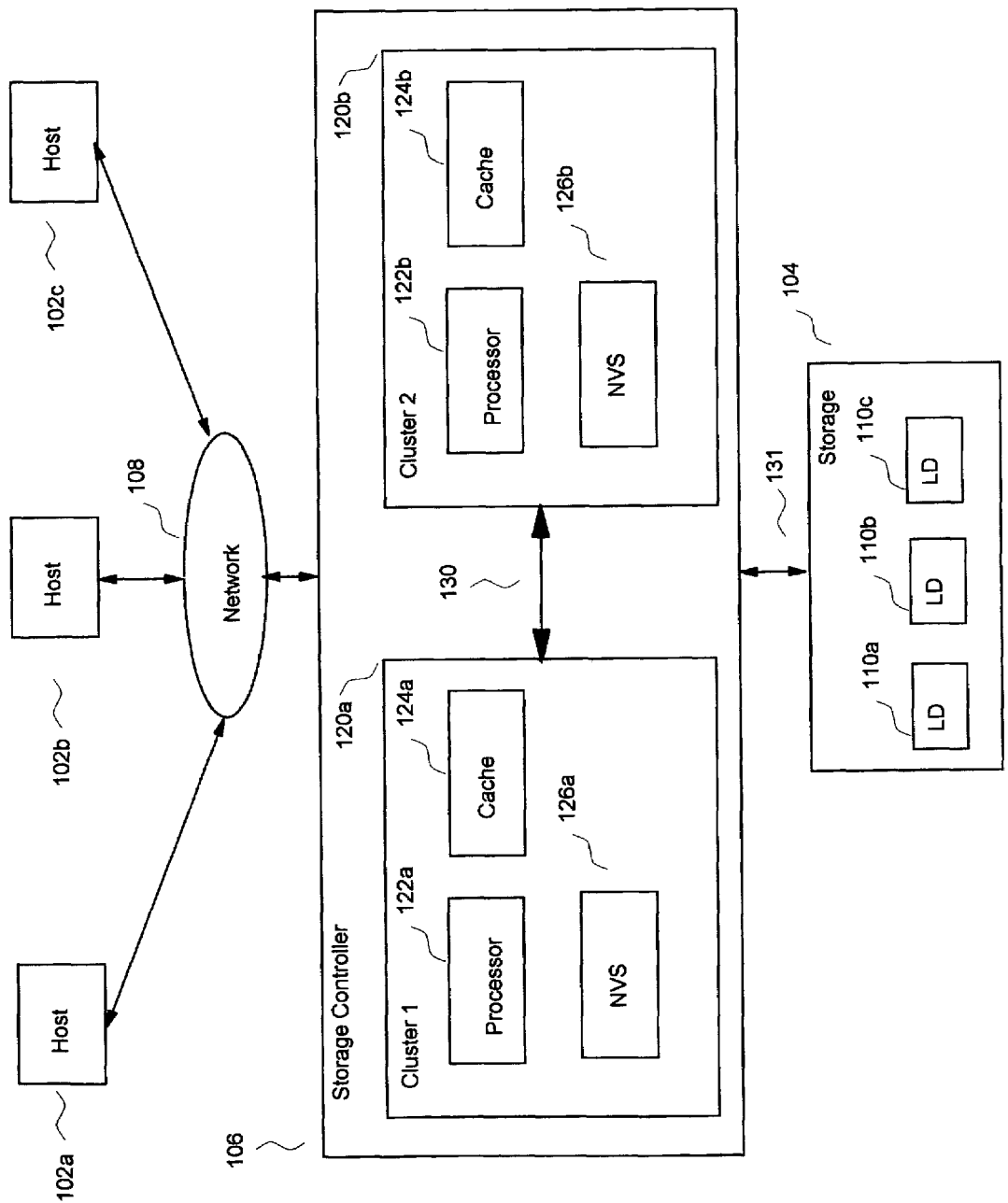
FIG. 1 is a block diagrammatic representation of the computing system environment in which aspects of the present invention are implemented.

FIG. 1 illustrates a computing architecture in which aspects of the invention are implemented. One or more hosts 102a, 102b, ... 102n are in data communication with a storage system 104, such as a DASD or other storage system known in the art, via a storage controller 106. The host 102 may be any computing device know in the art, such as a server, mainframe, workstation, personal computer, hand held computer, laptop, etc. The storage controller 106 and host system(s) 102 communicate via a network 108, which may comprise a storage area network (SAN), local area network (LAN), intranet, the internet, wide area network (WAN), etc. The storage system 104 may be comprised of hard disk drives, tape cartridge libraries, optical disks, or any suitable nonvolatile storage medium known in the art. The storage system 104 may be arranged as an array of storage devices, such as a DASD, redundant array of independent disks (RAID), virtualization device, etc. Storage controller 106 may comprise any storage controller or server known in the art. In certain implementations, the storage space 104 in storage controller 106 is configured as a plurality of logical devices (LD) 110a, 110b ... 110n.

The storage controller 106 includes two separate clusters 120a, 120b for hardware components to provide redundancy for improved availability. Although the illustrated embodiment is described in connection with a storage controller having clusters, it is appreciated that the invention may be applicable to a variety of systems utilizing multiple processors in which one processor can direct operations to be executed by another processor.

Each cluster 120a, 120b of the illustrated embodiment may be maintained on a separate power boundary, and includes a processor complex 122a, 122b, a cache 124a, 124b and nonvolatile storage (NVS) 126a, 126b. The NVS 126a, 126b may comprise a battery backed-up RAM or any other type of nonvolatile or volatile backup cache used to backup data in cache. The hosts 102a, 102b ... 102n submit application I/O requests directed to a target logical device (LD) 110a, 110b ... 110n, including write data, to the cluster 120a, 120b to which the target logical device (LD) 110a, 110b ... 110n is assigned. The NVS 126a, 126b in one cluster 122a, 122b is used to backup write data in the cache 124b, 124a in the other cluster 120b, 120a, e.g., NVS 126a backs up write data in cache 124b.

Clusters 120a, 120b run independently and communicate with each other using communication line 130 while controlling the transfer of customer data to/from storage 104. Communication line 130 may be an ethernet connection between ports on each cluster. Two clusters result in greater availability in the case of failure on one of the clusters. If one cluster fails, the other will remain active and continue to manage the transfer of data until the other cluster is repaired and brought back online. This redundancy of clusters provides the system resources for the concurrent automated LIC update process where one cluster can perform the update on the other cluster while the other cluster can be effectively off-line during the update.

Concurrent Update

Figure 2:
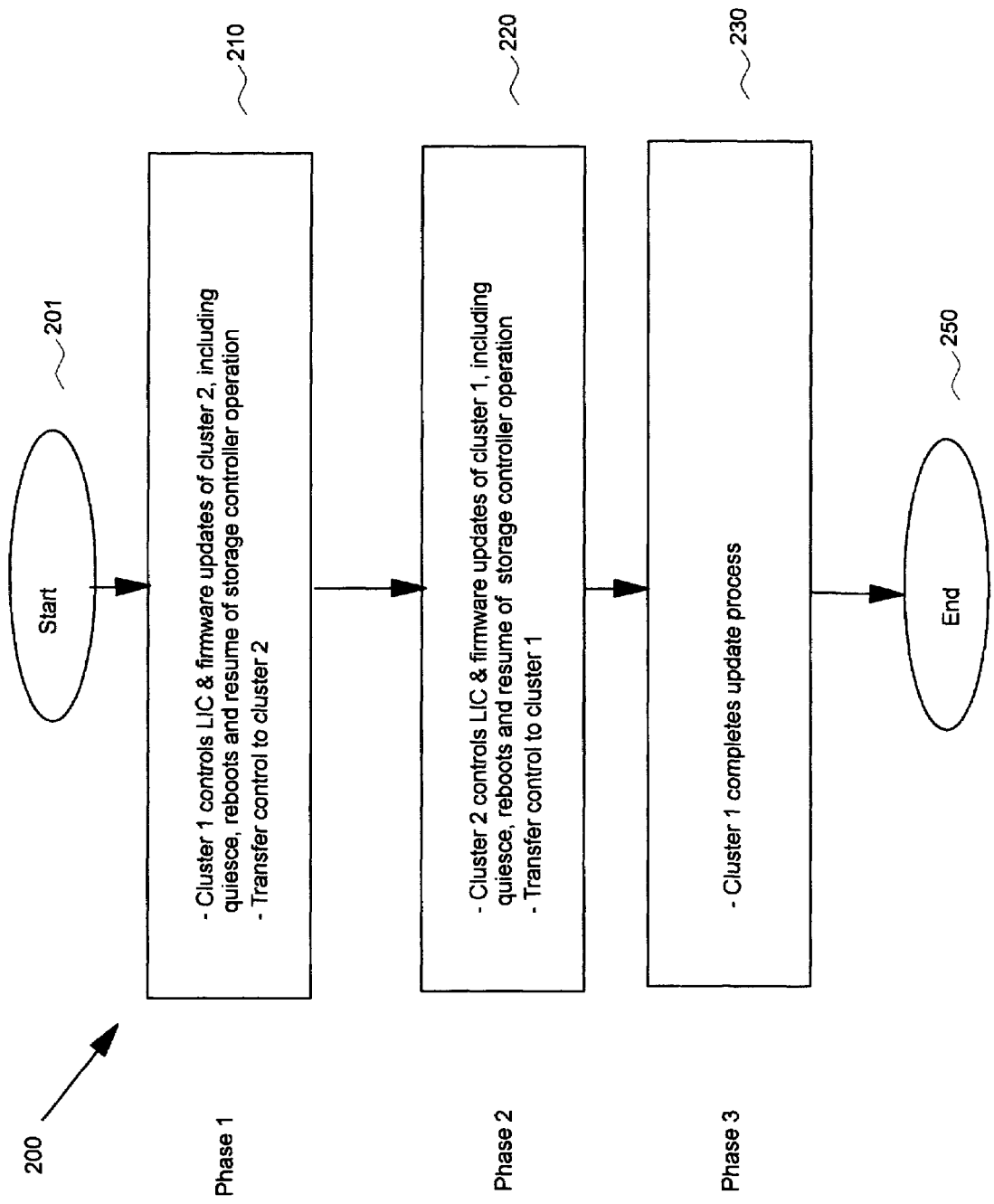
FIG. 2 contains flowchart 200 that details the major tasks necessary to perform a concurrent automated LIC update.

Flowchart 200, shown in FIG. 2 details the major tasks necessary to perform a concurrent automated LIC update. The automated LIC update steps of flowchart 200 are divided into three phases where each phase contains a sequence of steps required to perform the concurrent automated LIC update. At specific phases within the update process, control is automatically transferred to the partner cluster to complete the automated LIC update without operator intervention. Each of the three phases are further detailed in FIG. 3. A description of the major tasks shown in flowchart 200 are described first.

At step 210, the phase 1 major tasks to be accomplished are listed. At phase 1, cluster 1, 120a controls the LIC and firmware updates of cluster 2, 120b including quiescing, rebooting and resuming cluster 2, 120b control of storage controller operation. After cluster 2, 120b is operating, LIC update control is passed to cluster 2, 120b. At step 220, the phase 2 major tasks to be accomplished are listed. At phase 2, cluster 2, 120b controls the LIC and firmware updates of cluster 1, 120a including quiescing, rebooting and transferring control of storage controller operation from cluster 2, 120b to cluster 1, 120a. After cluster 1, 120a is operating, LIC update control is passed back to cluster 1, 120a. At step 230, (phase 3) cluster 1, 120a completes the update process.

Figure 3:
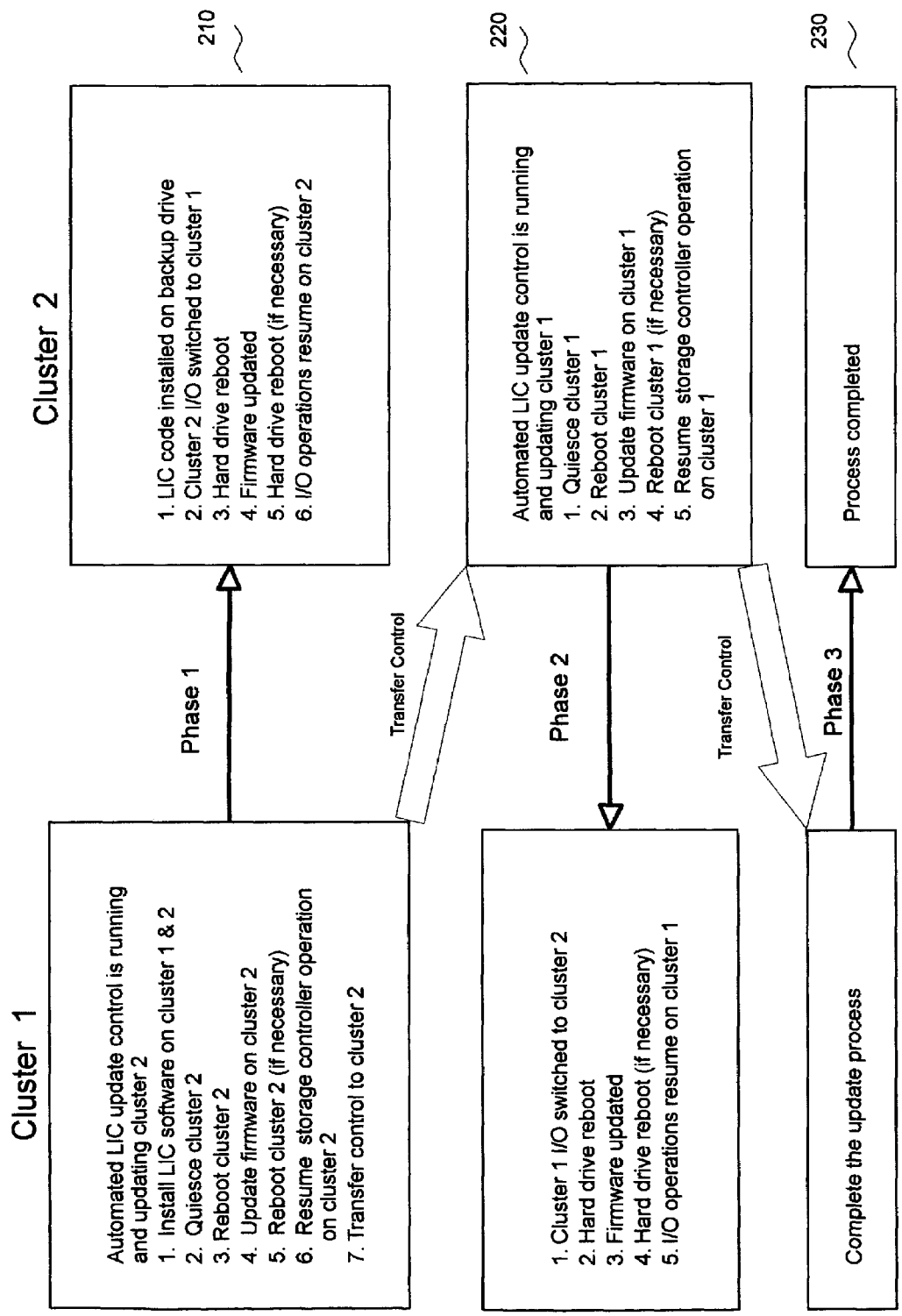
FIG. 3 illustrates the steps for each of three phases to perform a concurrent automated LIC update.

With reference to FIG. 3, each of the three phases are now described in more detail by listing a series of steps to accomplish each phase. In phase 1 (step 210), the automated LIC update control is assumed by cluster 1, 120a. An automated LIC dispatcher process runs within cluster 1, 120a that performs and verifies a series of operations to update all software necessary on any or all of the devices operating with in cluster 2, 120b. The dispatcher is an executable program that controls and manages the storage controller LIC update by calling a series of state actions from a state action table. The dispatcher, when first executed, initializes itself for the LIC update, calls the first state action in the state action table, and waits for that state action to complete. Once the state action has completed, the dispatcher retrieves the next state action, and so on until it reaches the end of the state action table. When the last state action in the state table has completed, the dispatcher completes clean up activities and the exits while completing the automated LIC update process.

Table 1 is an example of a state action table that the dispatcher may use. It will be recognized by those skilled in the art that variations to the contents of Table 1 are necessary depending upon the configuration and operating conditions of storage controller 106. The state action table shown in Table 1 consists of rows of individual state actions required to perform the LIC update. Each row contains a value indicating the current state, the action to execute, and the next state in the table to execute after the current state action has completed. The sequence of states in the state table begins with setting up for the LIC update. State actions to perform the necessary hardware updates follow and the state actions complete with the verification state confirming that the update was complete and successful.

TABLE 1

State action table

| State N | Action Action N | Next state M |
|---|---|---|
| 1 | install | 2 |
| 2 | quiesce | 3 |
| 3 | reboot | ... |
| ... | ... | ... |
| 59 | resume | 60 |
| 60 | complete | Last |

The first column of Table 1 is the state action, N, that represents any state that has a specific state action to be executed. The state actions to be executed are listed in the second column of Table 1. The third column indicates the next state, M, that needs to be executed after the successful completion of the current state action, N. For the given example, state action 1 is entered and it executes the action "install". After "install" completes, the next state column indicates that the next state is state 2. State 2 is then entered and the state action "quiesce" is executed. After the "quiesce" action is executed the state table indicates that state 3 is next. State 3 executes the reboot action and execution of the states continue on until state 60 is entered. The "complete" action is executed at state 60 and the next state field indicates that this is the last state and therefore the process is complete.

Figure 5:
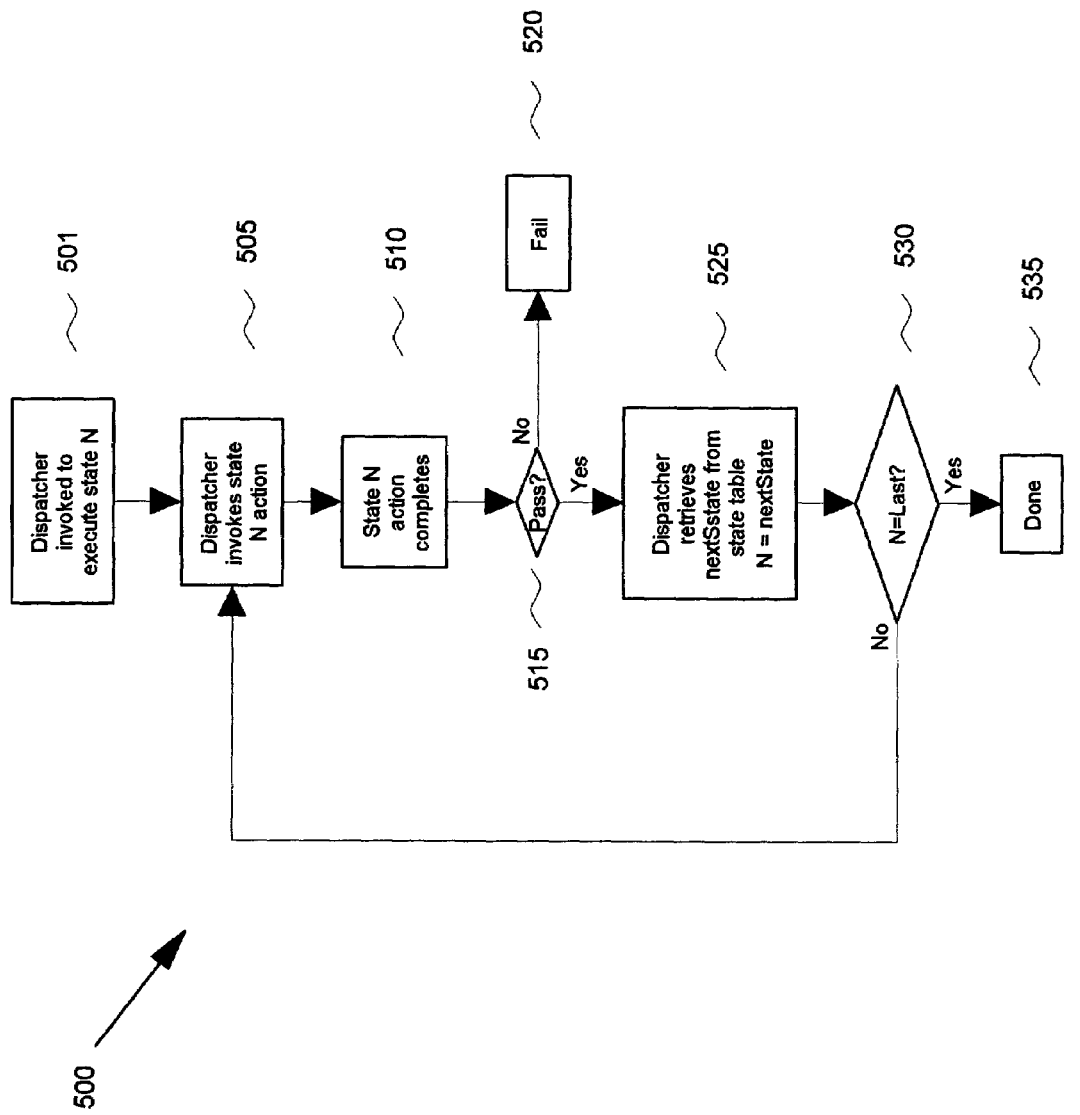
FIG. 5 contains flowchart 500 that shows the operation of an automated LIC dispatcher.

Each state action in the state action table is executed by the dispatcher. The dispatcher is invoked by an external process to execute state action, N. Flowchart 500, shown in FIG. 5 is an example of the operation of a dispatcher for use in the present invention. At step 501, the dispatcher is invoked to execute state action, N, of the state action table. At step 505, the dispatcher invokes state action, N, and waits for its successful completion at step 510. At step 515, the status of the execution of state action, N, is determined. If the state action does not complete successfully, then control is transferred to step 520, where the dispatcher fails and exits the process. At this point a permanent error has occurred and storage controller 106 will have to be repaired by service personnel. If the state action completes successfully then control is transferred to step 525. At step 525, the dispatcher obtains the next state action, M, from the state action table and the current state action, N, is assigned the value of the next state action, M, obtained from the third column of Table 1 for this example. At step 530, a test is performed on state action, N, to determine if it is the last state value. If it is not the last state value, then step 505 is executed and the dispatcher invokes the state action for state action, N, and continues as described above. All of the states of the state table are executed until the last state is encountered at step 530. After the execution of the last state, control is transferred to step 535, where the dispatcher successfully completes operation.

The present application is related to a copending patent application currently having Ser. No. 10/674,295, entitled "Automated Error Recovery of a Licensed Internal Code Update on a Storage Controller", TUC9-2003-0159, the disclosure of which is hereby incorporated by reference in its entirety.

Referring back to FIG. 3, the description of the steps for each phase for the concurrent update process is continued. At step 1 of phase 1, the LIC software is installed on cluster 1, 120*a* and cluster 2, 120*b*. The LIC software is copied from a software source (for example compact disk read only memory (CD-ROM), master console internet access, etc.) to a specified installation directory on each cluster's hard drive. The LIC software is installed to each cluster's alternate (backup) drive using for example, Advanced Interactive Executive (AIX) operating system dual drive alternate disk installation commands. These commands apply the LIC software only to the backup drives and not to the primary boot drives.

At step 2 of phase 1, cluster 2, 120*b* is quiesced and no new I/O is managed by cluster 2, 120*b*. During this time data is managed by cluster 1, 120*a* so that storage controller 106 is available for normal operation. Quiescing cluster 2, 120*b* is accomplished by setting the cluster into service mode. Quiescing cluster 2, 120*b* informs the operating system (now on cluster 1, 120*a* only) that the cluster 2, 120*b* resource is now dedicated to executing the firmware update process and is unavailable for normal storage controller use while the LIC update is being applied to the hardware components on cluster 2, 120*b*.

At step 3 of phase 1, cluster 2, 120*b* is rebooted by cycling the power supplied to cluster 2, 120*b*. When cluster 2, 120*b* returns to operation after the reboot it is now running on what was previously the backup drive which has the new installation of the LIC software. The storage controller firmware is not executed, instead, the operating system (OS) (for example Advanced Interactive Executive (AIX)) is in control of cluster 2, 120*b*. This is necessary so that the hardware controllers on cluster 2, 120*b* can be updated in a dedicated mode without sharing cluster 2, 120*b* with the storage controller operating system. Sharing cluster 2, 120*b* resources during the LIC update could result in permanent failures which may require on-site service personnel to resolve. Alternatively, other operating systems known in the art may be used, (for example UNIX LINUX, etc.) without limitation. At step 4 of phase 1, the firmware is updated on all devices within cluster 2, 120*b*. The devices updated may be for example, adapters, data controllers, rack power controllers, hardware controllers, data path controllers, and memory controllers. Automated LIC firmware update flags are written to disk for each device that is updated. At step 5 of phase 1, cluster 2, 120*b* is rebooted by cycling the power supplied to cluster 2, 120*b*. This ensures that cluster 2, 120*b* has updated all of the necessary components of the firmware update of step 4. This step may or may not be necessary depending upon the number of devices that received firmware updates at step 4, as indicated by the automated LIC firmware update flags. At step 6 of phase 1, control is transferred to cluster 2, 120*b*. I/O operations resume on cluster 2, 120*b* and cluster 2, 120*b* becomes available to process data. Cluster 2, 120*b* is now responsible for the LIC update process and the system enters phase 2 of the update process.

The automated LIC update for cluster 2, 120*b* is complete, however, cluster 1, 120*a* has not been updated. To update cluster 1, 120*a*, control of the automated LIC update must be assumed by cluster 2, 120*b*. The automated LIC update process is now aware that cluster 2, 120*b* has successfully returned for normal data processing operations and will begin the process of transferring the automated LIC update process over to cluster 2, 120*b*. At phase 2 of the update process, the automated LIC update control is assumed by cluster 2, 120*b*. An automated LIC dispatcher process runs within cluster 2, 120*b* that performs and verifies a series of operations to update all software necessary on any or all of the devices operating with in cluster 1, 120*a*. The automated LIC dispatcher is started on cluster 2, 120*b* by passing an index into the state control table (for example, Table 1 described above). This index into the state control table is the beginning of the sequence of steps required to update the LIC of cluster 1, 120*a*. When the dispatcher is running successfully on cluster 2, 120*b*, the dispatcher will completely exit cluster 1, 120*a* so that the automated LIC process is no longer running on cluster 1, 120*a*.

At step 1 of phase 2 (step 220 of FIG. 3), all I/O is transferred to cluster 2, 120*b*. I/O operations resume on cluster 2, 120*b* and cluster 2, 120*b* becomes available to process data. Cluster 1, 120*a* is quiesced so that no I/O is managed by cluster 1, 120*a*. During this time data is managed by cluster 2, 120*b* so that storage controller 106 is available for normal operation. Quiescing cluster 1, 120*a* is accomplished in the same manner as for cluster 2, 120*b* described above for step 2 of phase 1.

At step 2 of phase 2, cluster 1, 120*a* is rebooted by cycling the power supplied to cluster 1, 120*a*. When cluster 1, 120*a* returns to operation after the reboot it is now running on what was previously the backup drive which has the new installation of the LIC software. Only the operating system is allowed to run. This is necessary so that the hardware controllers on cluster 1, 120a can be updated in a dedicated mode without sharing cluster 1, 120a with the storage controller operating system.

At step 3 of phase 2, the firmware is updated on all devices within cluster 1, 120a. The devices updated may be for example, adapters, data controllers, rack power controllers, hardware controllers, data path controllers, and memory controllers. Automated LIC firmware update flags are written to disk for each device that is updated. At step 4 of phase 2, cluster 1, 120a is rebooted by cycling the power supplied to cluster 1, 120a. This ensures that cluster 1, 120a has updated all of the necessary components of the firmware update of step 3. This step may or may not be necessary depending upon the number of devices that received firmware updates at step 3, as indicated by the automated LIC firmware update flags. At step 5 of phase 2, I/O operations resume on cluster 1, 120a and cluster 1, 120a becomes available to process data. LIC update control is transferred to cluster 1, 120a. Cluster 1, 120a is now responsible for the LIC update process and the system enters phase 3 of the update process.

At phase 3 (step 230 of FIG. 3), the update process is completed by the verification of the code update. For example, processing logs are updated to reflect that the automatic LIC update process has completed, verification of the updates is processed to ensure that the system is fully operational, and the user is notified that the update process has successfully completed.

Nonconcurrent Update

The noncurrent automated LIC update can also be divided into three phases of operation where each phase contains a sequence of steps required to perform the nonconcurrent automated LIC update. Noncurrent automated LIC update occurs when storage controller 106 is under the control of service personnel to update the LIC level. At specific phases within the update process, control is automatically resumed to complete the automated LIC update without operator intervention.

Figure 4:
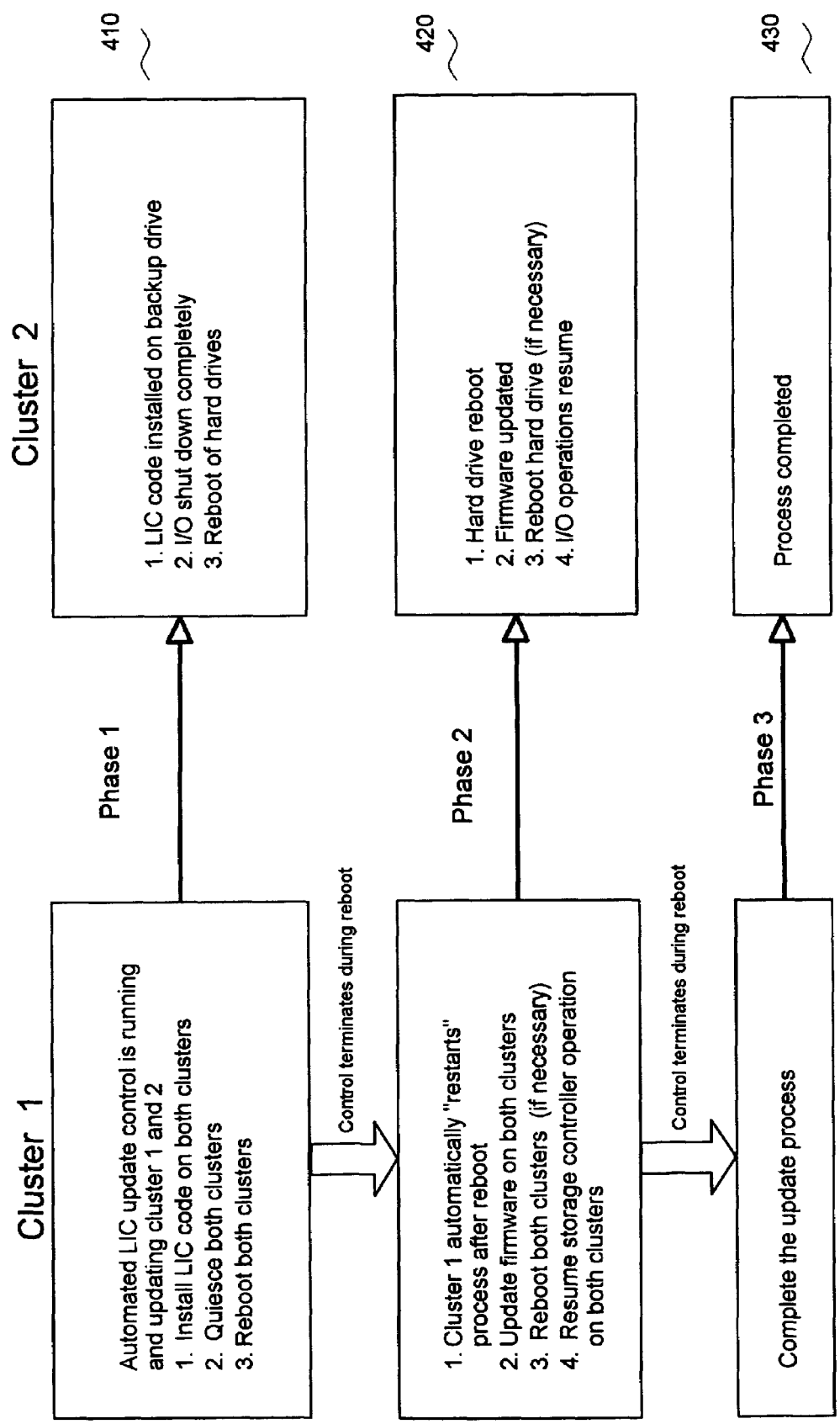
FIG. 4 illustrates the steps for each of three phases to perform a nonconcurrent automated LIC update.

FIG. 4 shows the three phases and the steps within each phase to perform the noncurrent automated LIC update. In phase 1 (step 410), the automated LIC update control is assumed by cluster 1, 120a. An automated LIC dispatcher process runs within cluster 1, 120a that performs and verifies a series of operations to update all software necessary on any or all of the devices operating within cluster 1, 120a and cluster 2, 120b. A similar but different state action table than that used by the concurrent automated LIC update is now in use by the dispatcher.

At step 1 of phase 1, the LIC software is installed on cluster 1, 120a and cluster 2, 120b. The LIC software is installed by copying from a software source (for example a CD-ROM disk, optical disk, etc.) to a specified installation directory on each cluster's hard drive. The LIC software is installed to both cluster's alternate (backup) drives using AX operating system dual drive alternate disk installation commands. These commands apply the LIC software only to the backup drives and not to the primary boot drives.

At step 2 of phase 1, cluster 1, 120a and cluster 2, 120b are quiesced so that no new I/O is managed by either cluster. During this time storage controller 106 is unavailable for normal operation. Quiescing cluster 1, 120a and cluster 2, 120b is accomplished by setting both clusters into the service mode simultaneously. This will stop all data I/O to storage controller 106 and prevent the operating system of storage controller 106 from running on top of AIX so that only the AIX operating system is running.

At step 3 of phase 1, cluster 1, 120a and cluster 2, 120b are rebooted by cycling the power supplied to both clusters. When cluster 1, 120a returns to operation after the reboot it is running on the backup drive which has the new LIC code installed on it. Cluster 1, 120a automatically assumes control of the noncurrent automated LIC update process and phase 2 begins.

At step 1 of phase 2, cluster 1, 120a automatically restarts the operation of the noncurrent automated LIC update process. The automated LIC update process first examines the status of the initial program load (IPL) to determine the error status of each cluster and to ensure that the system is booting up on the correct hard drive. After verification of the correct initial conditions the IPL status data directs the system to enter the expected nonconcurrent code load update process. The automated LIC update dispatcher process is restarted and prepares to execute step 2 of phase 2. While the dispatcher is running, the operating system is running and the storage facility firmware is not operational. The dispatcher continues to execute the state actions necessary to accomplish the steps in phase 2 of the LIC update process on both clusters.

At step 2 of phase 2, the firmware is updated on all devices within both clusters. The devices updated may be for example, adapters, data controllers, rack power controllers, hardware controllers, data path controllers, and memory controllers. Automated LIC firmware update flags are written to disk for each device that is updated. At step 3 of phase 2, cluster 1, 120a and cluster 2, 120b are rebooted by cycling the power supplied to both clusters. This ensures that cluster 1, 120a and cluster 2, 120b have updated all of the necessary components of the firmware update of step 2. This step may or may not be necessary depending upon the number of devices that received firmware updates at step 2, as indicated by the automated LIC firmware update flags. The automated LIC update process examines the status of the initial program load (IPL) to determine the error status of each cluster, to ensure that the system is booting up on the correct hard drive and to determine the status of the automated LIC update before going to the next step of phase 2.

At step 4 of phase 2 the dispatcher determines that the system is ready to resume operation, the IPL executes, and storage controller firmware is loaded and running on both clusters.

At phase 3 (step 430 of FIG. 4), the update process is completed by the verification of the code update. For example, processing logs are updated to reflect that the automatic LIC update process has completed, verification of the updates is processed to ensure that the system is fully operational, and the user is notified that the update process has successfully completed. The automated LIC process is now complete and the system is available for normal data processing use.

The nonconcurrent automated LIC update process is completely automated while the service personnel is on-site. Once the process has completed, the machine is running at an enhanced LIC level with minimal impact on customer availability.

The principles of the present invention now have been made clear in the illustrated embodiments. They will be immediately obvious to those skilled in the art, many modifications of structure, arrangement, proportions, elements, materials and components used in the practice of the invention. The appended claims are, therefore, intended to cover and embrace any such modifications within the true spirit and scope of the invention.

What is claimed is:

1. A method for performing a concurrent automated Licensed Internal Code update on a storage controller, comprising the steps of:
   providing a storage controller comprising a first cluster and a second cluster, wherein said first cluster comprises a first cluster installation directory, a first cluster primary boot drive and a first cluster backup drive, and wherein said second cluster comprises a second cluster installation directory, a second cluster primary boot drive and a second cluster backup drive;
   copying a Licensed Internal Code update to said first cluster installation directory and to said second cluster installation directory;
   installing said Licensed Internal Code update on said first cluster backup drive but not on said first cluster primary boot drive;
   installing said Licensed Internal Code update on said second cluster backup drive but not on said second cluster primary boot drive;
   continuing operation of said storage controller with at least one of said first cluster and said second cluster while updating a first cluster firmware on said first cluster and updating a second cluster firmware on said second cluster;
   verifying said first cluster firmware on said first cluster; and
   verifying said second cluster firmware on said second cluster.

2. The method of claim 1, wherein said continuing operation step further comprises the steps of:
   quiescing said second cluster;
   transferring operation control of said storage controller to said first cluster;
   rebooting said second cluster using said second cluster backup drive;
   transferring operation control of said storage controller to said second cluster;
   quiescing said first cluster;
   rebooting said first cluster using said first cluster backup drive;
   transferring operation control of said storage controller to said first cluster and said second cluster.

3. The method of claim 1, further comprising the steps of:
   running an automated Licensed Internal Code dispatcher process that calls state actions from a state action table, wherein said state action table comprises a plurality of individual state actions to perform said concurrent automated Licensed Internal Code update.

4. A method performing a nonconcurrent automated Licensed Internal Code update on a storage controller, comprising the steps of:
   providing a storage controller comprising a first cluster and a second cluster, wherein said first cluster comprises a first cluster installation directory, a first cluster primary boot drive and a first cluster backup drive, and wherein said second cluster comprises a second cluster installation directory, a second cluster primary boot drive and a second cluster backup drive;
   copying a Licensed Internal Code update to said first cluster installation directory and to said second cluster installation directory;
   installing said Licensed Internal Code update on said first cluster backup drive but not on said first cluster primary boot drive;
   installing said Licensed Internal Code update on said second cluster backup drive but not on said second cluster primary boot drive;
   suspending operation of said storage controller;
   quiescing said first cluster;
   quiescing said second cluster;
   rebooting said first cluster using said first cluster backup drive;
   rebooting said second cluster using said second cluster backup drive.

5. The method of claim 4, further comprising the steps of:
   verifying said first cluster firmware on said first cluster; and
   verifying said second cluster firmware on said second cluster.

6. The method of claim 4, further comprising the steps of:
   running an automated Licensed Internal Code dispatcher process that calls state actions from a state action table, wherein said state action table comprises a plurality of individual state actions to perform said nonconcurrent automated Licensed Internal Code update.

7. A computing system capable of automatically updating Licensed Internal Code on a storage controller, wherein said storage controller comprises:
   a first cluster comprising a first cluster installation directory, a first cluster primary boot drive and a first cluster backup drive;
   a second cluster comprising a second cluster installation directory, a second cluster primary boot drive and a second cluster backup drive;
   a communication line between said first cluster and said second cluster;
   a state action table, wherein said state action table comprises a plurality of individual state actions for a concurrent automated Licensed Internal Code update;
   an automated Licensed Internal Code dispatcher executing said state actions from said state action table to perform method steps comprising:
   copying a Licensed Internal Code update to said first cluster installation directory and to said second cluster installation directory;
   installing said Licensed Internal Code update on said first cluster backup drive but not on said first cluster primary boot drive;
   installing said Licensed Internal Code update on said second cluster backup drive but not on said second cluster primary boot drive;
   continuing operation of said storage controller with at least one of said first cluster and said second cluster while updating a first cluster firmware on said first cluster and updating a second cluster firmware on said second cluster;
   verifying said first cluster firmware on said first cluster; and
   verifying said second cluster firmware on said second cluster.

8. The computing system of claim 7, wherein said continuing operation step further comprises the steps of:
   quiescing said second cluster;
   transferring operation control of said storage controller to said first cluster;
   rebooting said second cluster using said second cluster backup drive
   transferring operation control of said storage controller to said second cluster;
   quiescing said first cluster;

rebooting said first cluster using said first cluster backup drive;

transferring operation control of said storage controller to said first cluster and said second cluster.

9. A computing system for automatically updating Licensed Internal Code on a storage controller disposed therein, wherein said storage controller comprises:

a first cluster comprising a first cluster installation directory, a first cluster primary boot drive and a first cluster backup drive;

a second cluster comprising a second cluster installation directory, a second cluster primary boot drive and a second cluster backup drive;

a communication line between said first cluster and said second cluster;

a state action table, wherein said state action table comprises a plurality of individual state actions for a nonconcurrent automated Licensed Internal Code update;

an automated Licensed Internal Code dispatcher executing state actions from said state action table to perform method steps comprising:

copying a Licensed Internal Code update to said first installation directory and to said second cluster installation directory;

installing said Licensed Internal Code update on said first backup drive but not on said first primary boot drive;

installing said Licensed Internal Code update on said second cluster backup drive but not on said second cluster primary boot drive;

suspending operation of said storage controller;

quiescing said first cluster;

quiescing said second cluster;

rebooting said first cluster using said first cluster backup drive;

rebooting said second cluster using said second cluster backup drive;

transferring operation control of said storage controller to said first cluster and said second cluster.

10. The computing system of claim 9, wherein said method steps further comprise the steps of:

verifying said first cluster firmware on said first cluster; and verifying said second cluster firmware on said second cluster.

11. An article of manufacture comprising a data storage medium tangibly embodying a program of machine-readable instructions executable by a digital processing apparatus to perform method steps for automatically updating Licensed Internal Code on a storage controller, said storage controller comprising:

a first cluster comprising a first cluster installation directory, a first cluster primary boot drive and a first cluster backup drive;

a second cluster comprising a second cluster installation directory, a second cluster primary boot drive and a second cluster backup drive;

a communication line between said first cluster and said second cluster, a state action table, wherein said state action table comprises a plurality of individual state actions for a concurrent automated Licensed Internal Code update and an automated Licensed Internal Code dispatcher executing said state actions from said state action table, said method steps comprising:

copying a Licensed Internal Code update to said first cluster installation directory and to said second cluster installation directory;

installing said Licensed Internal Code update on said first cluster backup drive but not on said first cluster primary boot drive;

installing said Licensed Internal Code update on said second cluster backup drive but not on said second cluster primary boot drive;

continuing operation of said storage controller with at least one of first cluster and said second cluster while updating a first cluster firmware on said first cluster and updating a second cluster firmware on said second cluster;

verifying said first cluster firmware on said first cluster; and verifying said second cluster firmware on said second cluster.

12. The article of manufacture of claim 11, wherein said continuing operation step further comprises the steps of:

quiescing said second cluster;

transferring operation control of said storage controller to said first cluster;

rebooting said second cluster using said second cluster backup drive;

transferring operation control of said storage controller to said second cluster;

quiescing said first cluster;

rebooting said first cluster using said first cluster backup drive;

transferring operation control of said storage controller to said first cluster and said second cluster.

13. An article of manufacture comprising a data storage medium tangibly embodying a program of machine-readable instructions executable by a digital processing apparatus to perform method steps for automatically updating Licensed Internal Code on a storage controller, said storage controller comprising:

a first cluster comprising a first cluster installation directory, a first cluster primary boot drive and a first cluster backup drive;

a second cluster comprising a second cluster installation directory, a second cluster primary boot drive and a second cluster backup drive;

a communication line between said first cluster and said second cluster, a state action table, wherein said state action table comprises a plurality of individual state actions for a nonconcurrent automated Licensed Internal Code update; and an automated Licensed Internal Code dispatcher executing said state actions from said state action table, said method steps comprising:

copying a Licensed Internal Code update to said first cluster installation director and to said second cluster installation directory;

installing said Licensed Internal Code update on said first cluster backup drive but not on said first cluster primary boot drive;

installing said Licensed Internal Code update on said second cluster backup drive but not on said second cluster primary boot drive;

suspending operation of said storage controller;

quiescing said first cluster;

quiescing said second cluster;
rebooting said first cluster using said first cluster backup drive;
rebooting said second cluster using said second cluster backup drive.

14. The article of manufacture of claim 13, wherein said method steps further comprise the steps of:

verifying said first cluster firmware on said first cluster; and
verifying said second cluster firmware on said second cluster.

* * * * *